United States Patent [19]

Beaver

[11] Patent Number: 4,687,170

[45] Date of Patent: Aug. 18, 1987

[54] CAMERA MOUNTING BRACKET

[75] Inventor: Richard C. Beaver, Inglewood, Calif.

[73] Assignee: American Electronics, Inc., Fullerton, Calif.

[21] Appl. No.: 871,479

[22] Filed: Jun. 6, 1986

[51] Int. Cl.⁴ .............................................. E04B 3/00
[52] U.S. Cl. ................................ 248/543; 248/289.1; 248/419; 248/278; 248/183
[58] Field of Search ...................... 248/289.1, 278, 425, 248/225.31, 176, 177, 178, 183, 186, 187, 543, 418

[56] References Cited

U.S. PATENT DOCUMENTS

| 1,459,856 | 6/1923 | Otte | 248/278 |
| 1,609,396 | 12/1976 | Blonigen | 248/291 |
| 2,697,577 | 12/1954 | Wolf | 248/278 |
| 2,802,395 | 8/1957 | Madion | 248/291 |
| 3,730,474 | 5/1973 | Bowers | 248/289.1 |
| 4,034,946 | 7/1977 | Zimmer | 248/278 |
| 4,310,136 | 1/1982 | Mooney | 248/278 |

FOREIGN PATENT DOCUMENTS

| 1941013 | 8/1969 | Fed. Rep. of Germany | 248/278 |
| 879336 | 10/1961 | United Kingdom | 248/289.1 |

Primary Examiner—Reinaldo P. Machado
Assistant Examiner—Alvin Chin-Shue
Attorney, Agent, or Firm—Charles E. Wills

[57] ABSTRACT

A mount for a surveillance camera or the like for moving the camera between an operating position and a servicing position for changing film or lens or the like. The camera and mount have interengaging support means and a fastener for joining the support means together for supporting the camera. A shaft is positioned in a mounting bracket, with the shaft having threaded sections projecting upwardly and downwardly from the mounting bracket. The support means is fastened to the upper end of the shaft with a detent member carried on the shaft for engaging a detent member in the bracket, with the shaft detent member being adjustable with respect to the camera position. The shaft is clamped to the bracket by a nut or the like on the downwardly extending section. With the detents engaged, the camera is initially adjusted to the desired operating position and then the support means is clamped at the upper end of the shaft. When it is desired to move the camera for servicing, the clamp at the lower end of the shaft is loosened, the camera and shaft rotated with respect to the bracket to any location, and after servicing, the camera is again rotated to engage the detent, and the shaft is clamped in position.

12 Claims, 3 Drawing Figures

CAMERA MOUNTING BRACKET

BACKGROUND OF THE INVENTION

This invention relates to a mount for a camera, and in particular to a new and improved mount which permits a camera to be moved from a desired operating position to a servicing position, and then returned to the desired operating position without requiring any adjustment or inspection of the camera position.

The invention is particularly suited for the use with surveillance cameras which typically are mounted in unobtrusive and out of the way locations having a minimum access for adjustment, servicing, film changing and the like. With this type of camera, considerable effort is expended in initially setting the camera angle and focus. However, the camera has to be moved from this desired position in order to change film magazines, or change lenses or the like. It is highly desirable that this type of servicing can be accomplished with a minimum of effort and minimum of required skill, while retaining the required camera coverage.

In the past, it has been the practice to fix the camera in the desired position and thereafter not disturb its location. This has dictated that cameras be installed in locations where the necessary servicing can be accomplished. However, if the camera can be operated in one position and serviced in another position, the restrictions on the location of the camera are lessened and cameras may be located in less obtrusive and/or more effective locations.

SUMMARY OF THE INVENTION

A mount for a camera for moving between an operating position and a servicing position, with the camera having a first support means and with the mount having a second support means, and a fastener for joining the first and second support means for supporting the camera with the second support means. A mounting bracket with a shaft positioned in the bracket, a flange member with a first detent means, and a first clamp means for clamping the second support means, the flange and the shaft together for moving the shaft with the camera movement, with the position of the flange member being adjustable with respect to the camera. A second detent means for engaging the first detent means, and second clamp means for clamping the shaft in the bracket to prevent shaft and camera movement. Initially, the detent is engaged, the first clamp means is loosened and the camera is adjusted to the desired operating position. Then the first clamp means is tightened and no further camera adjustment is required. The camera is clamped in the operating position with the detent engaged by the second clamp means. When it is desired to service the camera, second clamp means is loosened, the camera is rotated to any desired location, and after servicing, the camera is rotated to engage the detent and the second clamp means is tightened.

DESCRIPTION OF THE PREFERRED EMBODIMENT

Figure 1:
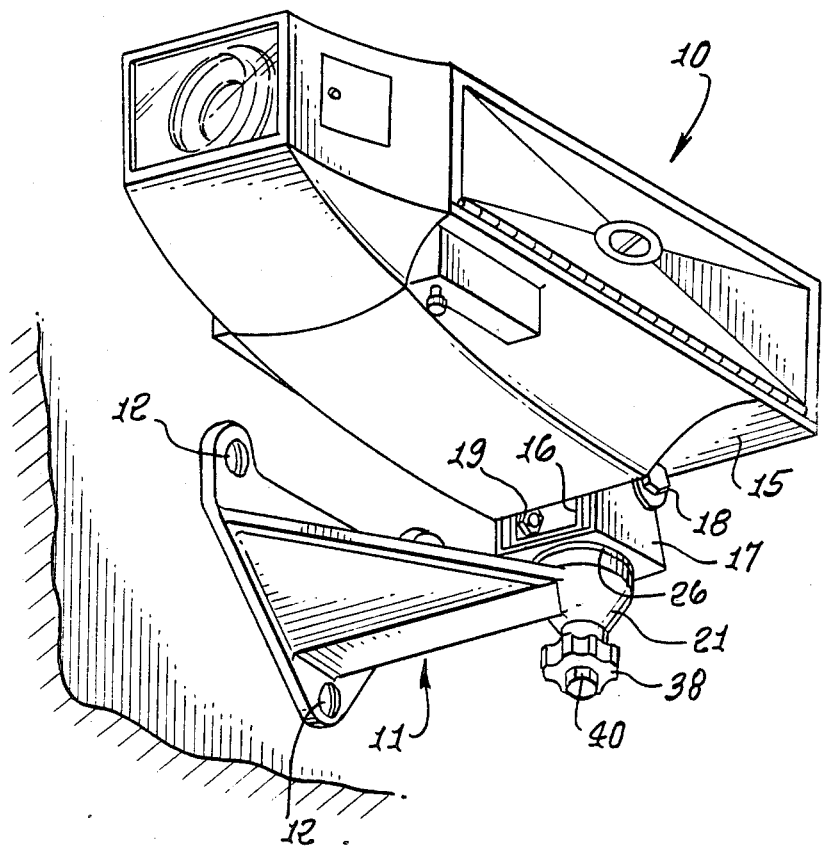
FIG. 1 is a perspective view of a surveillance camera incorporating the presently preferred embodiment of the mount of the invention.

In FIG. 1, a surveillance camera 10 is shown supported on a bracket 11, which bracket is adapted for attaching to a wall by screws 12.

The camera has support means illustrated as ribs 14 projecting from the lower rear portion of a camera housing 15. Each of the ribs 14 is fastened between inner and outer U-shaped brackets 16, 17 by a bolt 18 and nut 19.

A shaft 20 is positioned in a vertical opening in the outer end 21 of the bracket 11. The upper end 24 of the shaft 20 is of reduced diameter, and terminates at a shoulder 25. The upper end 24 passes through a central opening in a washer or flange member 26 and through similar central openings in the U brackets 16, 17, with the U brackets and washer being clamped against the shoulder 25 of the shaft 20 by a nut 28 fitted onto the upper end of the shaft. A conventional washer 29 may be positioned between the nut 28 and the inner U bracket 16 if desired.

Another opening in the form of a slot 32 is provided in the washer 26, and serves as a detent opening.

A mating detent mechanism is provided in the outer end 21 of the bracket 11, and comprises a compression spring 33 positioned in an opening 34 in the bracket, with a ball 35 at the upper end of the spring.

Means are provided for clamping the shaft 20 in the bracket 11 and typically includes a knob 38 fitted onto a projecting lower end 39 of the shaft 20. Preferably, parallel flat surfaces 40 are provided at the end 39 of the shaft 20 for engaging a tool, such as a wrench. Alternatively, other tool engaging configurations can be utilized, such as a hexagonal opening in the end of the shaft for receiving an Allen wrench.

Figure 2:
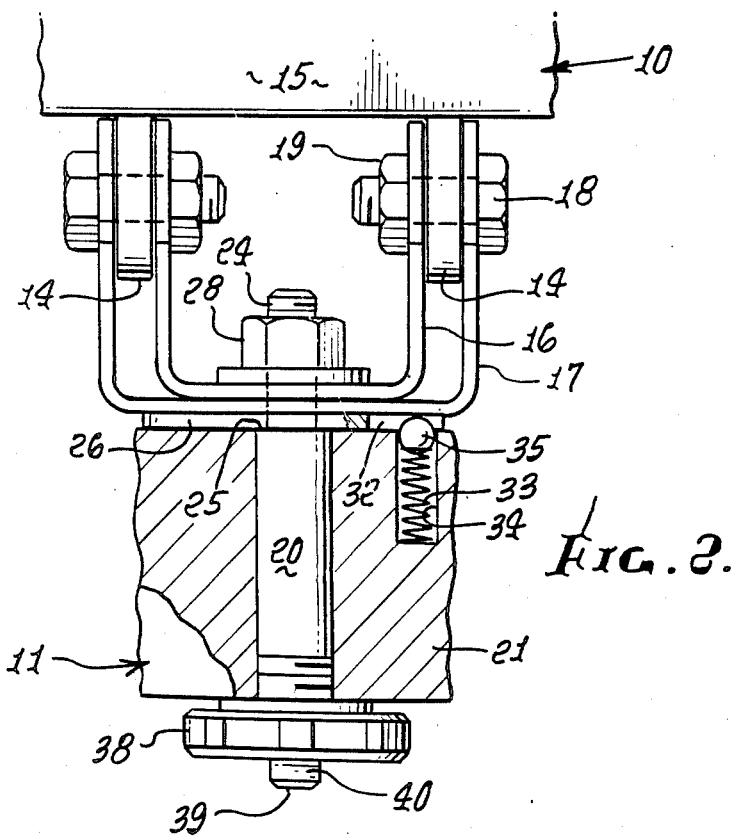
FIG. 2 is an enlarged partial sectional view through the mount of FIG. 1.
Figure 3:
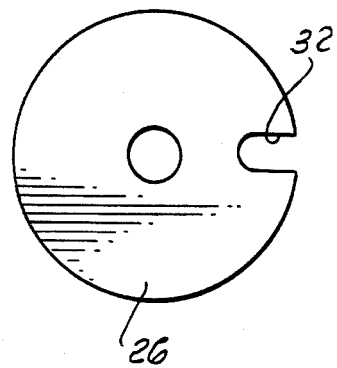
FIG. 3 is a plan view of a flange member or washer of FIG. 2.

In operation, the components are assembled as shown in FIGS. 1 and 2. The camera is pivoted about the bolts 18 on the horizontal axis to the desired camera operating position. Then the nuts 19 are tightened on the bolts 18 fixing the camera in the horizontal axis. There is no subsequent need for changing the camera position about the horizontal axis.

Next, the washer 26 is rotated to bring the detent opening 32 into engagement with the detent ball 35 and the camera is rotated about the vertical axis to the desired operating position. Then the nut 28 is tightened to clamp the U brackets 16, 17 and the washer 26 against the shoulder 25 of the shaft 20. Preferably this is accomplished by using one tool to engage the lower end of the shaft 20 and a second tool to engage the nut 28. In the embodiment illustrated, the washer or flange member 26 is manufactured as a separate item, but could be made a unitary portion of the shaft 20 if desired. Similarly, the detent spring 33 and ball 35 are preferably mounted in the end 21 of the bracket 11, but the configuration could be reversed with the detent opening in the end of the bracket and the spring and ball being carried in a rotating element. Other resilient detent members may be used in place of the ball and spring, such as a resilient finger fixed at one end and engaging the detent spring at the other end.

With the camera loaded and ready for operation, the camera is rotated to engage the detent ball with the detent opening and is clamped in position by tightening the knob 38 on the lower end of the shaft 20 thereby clamping the shaft in the bracket 11. Since the camera has already been exactly positioned in the mount with the detent engaged, it is now accurately positioned without further checking. When it is desired to change film or carry out other servicing, the knob 38 is loosened and the camera is rotated to a servicing position. After the servicing is finished, the camera is rotated to engage the detent and the knob 38 is tightened. The camera is now ready for use in the operating position.

Thus it is seen that the camera mount as disclosed and claimed herein incorporates a memory which once adjusted with the camera in the desired operating position, permits always returning the camera to its same position without further checking.

I claim:

1. In a mount for a camera for moving between an operating position and a servicing position, the camera having a first support means, the combination of:
   a second support means and fastener means for joining together said first and second support means for supporting the camera with said second support means;
   a bracket for attachment to a fixed support;
   a shaft rotatably positioned in said bracket;
   a flange member with a first detent means associated with the second support means;
   first clamp means for clamping together said second support means, said flange member and said shaft for moving said shaft with the camera movement, with the position of said flange member being adjustable with respect to the camera to indicate the operating position of the camera;
   a second detent means carried by said bracket for engaging said first detent means at the operating position of the camera; and
   second clamp means for releasably clamping said shaft in said bracket to prevent shaft and camera movement in the operating position.

2. A camera mount as defined in claim 1 wherein one of said detent means comprises an opening and the other of said detent means comprises a ball and spring, with said spring urging said ball into said opening.

3. A camera mount as defined in claim 1 wherein said flange member is separate from said shaft and rotatable with respect to said shaft.

4. A camera mount as defined in claim 1 wherein said first detent means is a first opening in said flange member, and said second detent means includes a spring and ball positioned in a second opening in said bracket, with said spring urging said ball into said first opening.

5. A camera mount as defined in claim 4 wherein said flange member is separate from said second support means and rotatable with respect thereto.

6. A camera mount as defined in claim 5 wherein said shaft has a section with a shoulder and said flange member comprises a washer with an opening for receiving said shaft with said flange member abutting said shoulder and with said first clamp means clamping said flange member against said shoulder.

7. A camera mount as defined in claim 1 wherein said shaft is rotatably mounted in said bracket, with said shaft having upper and lower end sections each projecting from said bracket.

8. A camera mount as defined in claim 7 wherein said upper end section of said shaft is threaded and said second support means includes an opening for receiving said upper end section, and said first clamp means includes a nut for clamping said second support means and flange member against a shoulder of said shaft while permitting rotation of said shaft and camera with respect to said bracket.

9. A camera mount as defined in claim 8 wherein said flange member is separate from said shaft and is clamped against said shoulder by said nut and said second support means.

10. A camera mount as defined in claim 9 wherein said lower section of said shaft is threaded and said second clamp means comprises a second nut for engaging said threaded lower shaft section for preventing movement of the shaft relative to the bracket in the operating position.

11. A camera mount as defined in claim 10 wherein said lower end section of said shaft includes means for engagement with a tool for positioning said shaft and flange member relative to said second support means when said first clamp means is loosened.

12. A camera mount as defined in claim 11 wherein said tool engaging means comprises opposed flat surfaces on a portion of said lower end section which projects below said second nut.

* * * * *